3,449,431
TERTIARY γ-ALKOXYPROPYLAMINE OXIDES
Robert A. Swenson, St. Louis Park, Minn., assignor to
 Cargill, Incorporated, a corporation of Delaware
No Drawing. Filed Oct. 22, 1965, Ser. No. 502,349
Int. Cl. C07c 93/02, 93/00
U.S. Cl. 260—584                                                4 Claims

ABSTRACT OF THE DISCLOSURE

Tertiary γ-alkoxypropylamine oxides having the formula:

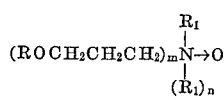

where R is an alkyl radical of between about 6 and about 20 carbon atoms, $R_1$ is a methyl radical or an oxyolefin radical of the formula

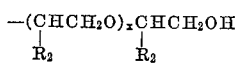

where $R_2$ is hydrogen or a methyl radical and $x$ is between 0 and about 9, and where $m$ is 1 or 2, $n$ is 0 or 1 and the sum of $m$ and $n$ is 2. A method of manufacturing such compounds includes heating a tertiary γ-alkoxypropylamine to a reaction temperature between about 50° C. and about 65° C., slowly adding an oxidizing agent, adding a solvent for the amine oxide product, and raising the reaction temperature to between about 75° C. and about 80° C. to complete the reaction. These oxides are useful as wetting agents and emulsifiers, and are particularly useful as suds builders in anionic detergents and as hair conditioners in shampoos.

---

This invention relates generally to amine oxides, and more particularly, it relates to novel tertiary γ-alkoxypropylamine oxides having the formula:

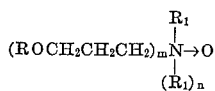

where R is an alkyl radical of between about 6 and about 20 carbon atoms; $R_1$ is a methyl radical or an oxyolefin radical of the formula

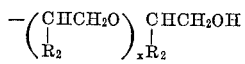

where $R_2$ is hydrogen or a methyl radical and $x$ is between 0 and about 9; and where $m$ is 1 or 2, $n$ is 0 or 1 and the sum of $m$ and $n$ is 2; and to a method of manufacturing such compounds.

Tertiary amine oxides having the formula $RR_1R_2N{\rightarrow}O$ where R is a long chain alkyl radical and $R_1$ and $R_2$ are short chain alkyl radicals are known. The arrow is a conventional representation of a semipolar bond that occurs between the nitrogen and oxygen atoms in amine oxides. Tertiary alkyl amine oxides wherein one of the alkyl radicals is substantially longer than the remaining alkyl radicals have good surface activity, and are generally useful as surfactants in wetting compounds, dispersing compounds, synthetic detergents, and hair shampoos. However, many of the known tertiary alkyl amine oxides which include a long chain alkyl radical and two short chain alkyl radicals are not as soluble in water as might be desired for some applications. Accordingly, it would be desirable to provide tertiary alkyl amine oxides which have increased solubility in water.

It is, therefore, a principal object of the present invention to provide novel tertiary γ-alkoxypropylamine oxides. Another object is to provide novel tertiary γ-alkoxypropylamine oxides which have improved solubility in water. Another object is to provide novel tertiary γ-alkoxypropylamine oxides which may be employed as wetting agents and emulsifiers. An additional object is to provide novel tertiary γ-alkoxypropylamine oxides which may be employed as suds builders in anionic detergents. A still further object is to provide novel tertiary γ-alkoxypropylamine oxides which are useful as hair conditioners in shampoos. Yet another object is to provide a convenient and economical method for the manufacture of tertiary γ-alkoxypropylamine oxides.

Other objects and advantages of the present invention will become apparent from the following detailed description.

Generally, the present invention is directed to novel tertiary alkyl amine oxides and to a method of manufacturing such compounds. More specifically, the invention is directed to novel tertiary γ-alkoxypropylamine oxides having the formula

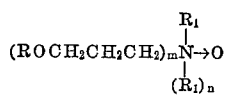

where R is an alkyl radical of between about 6 and about 20 carbon atoms; $R_1$ is a methyl radical or an oxyolefin radical of the formula

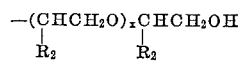

where $R_2$ is hydrogen or a methyl radical and $x$ is between 0 and about 9; and where $m$ is 1 or 2, $n$ is 0 or 1 and the sum of $m$ and $n$ is 2.

It has been discovered that tertiary γ-alkoxypropylamine oxides which include an alkoxypropyl radical have improved solubility in water as compared to known tertiary alkyl amine oxides. The improved solubility of the tertiary γ-alkoxypropylamine oxides of the present invention causes these amine oxides to be particularly useful as suds builders in anionic detergents and as hair conditioners in shampoos. The novel tertiary γ-alkoxypropylamine oxides disclosed herein also provide enhanced mildness to alkylaryl sulfonic acid detergents.

The tertiary γ-alkoxypropylamine oxides of the present invention include an alkoxypropyl radical wherein the alkyl portion of the radical, indicated by R in the above formula, contains between about 6 and about 20 carbon atoms. R may be a saturated or unsaturated, straight or branched chain alkyl radical, and it is contemplated that the alkyl radical may contain between 1 and 9, preferably between 1 and 3.5 mols of olefin oxide, e.g., ethylene oxide or propylene oxide. Saturated straight chain alkyl radicals are preferred, but branched chain radicals and/or unsaturated radicals are contemplated. Specific straight chain alkyl radicals contemplated by the present invention include hexyl, octyl, decyl, dodecyl, tetradecyl, hexadecyl and octadecyl radicals, or mixtures thereof, such as are obtained from coconut and/or tallow fatty acids. Good results are also obtained by employing a mixture of $C_{11}$ to $C_{15}$ alcohols.

$R_1$ may be a methyl radical, a polyoxyethylene radical having the formula $(CH_2CH_2O)_xCH_2CH_2OH$, or a polyoxypropylene radical having the formula

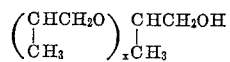

where $x$ is between 0 and about 9. When $x$ is 0, $R_1$ is a hydroxyethyl or hydroxypropyl radical. An amine oxide containing a polyoxyethylene radical tends to be highly hydrophilic, while an amine oxide containing a polyoxypropylene radical tends to be less hydrophilic. Accordingly, preparation of amine oxides containing either a polyoxyethylene or a polyoxypropylene radical may be based upon the intended use of the amine oxide. The total number of mols of olefin oxide per mole of amine oxide desirably should not exceed about 10, and preferred amine oxides are provided when the total number of mols of olefin oxide per mol of amine oxide is between about 2 and about 3.

The γ-alkoxypropylamine oxides of the present invention may be prepared by reacting a tertiary γ-alkoxypropylamine with an oxidizing agent such as hydrogen peroxide, peracidic acid, permonosulfuric acid or ozone.

The tertiary γ-alkoxypropylamine reactant may be prepared from a long chain alkyl alcohol raw material. When it is desired that $R_1$ be a methyl radical, the tertiary γ-alkoxypropyldialkylamine may be prepared in accordance with the method disclosed in copending application Ser. No. 502,557, filed Oct. 22, 1965. When it is desired that $R_1$ be a polyoxyolefin radical, the polyoxyolefin adduct of the γ-alkoxypropylamine may be prepared in accordance with copending application Ser. No. 502,472, filed Oct. 22, 1965. It is understood that the disclosures of Ser. Nos. 502,557 and 502,472 are incorporated herein by reference.

The tertiary γ-alkoxypropylamine oxide is prepared by introducing the tertiary γ-alkoxypropylamine into a reaction vessel and heating the tertiary amine to a reaction temperature of between about 50° C. and about 80° C. Lower reaction temperatures may be employed if desired, but the reaction proceeds at a very slow rate at lower temperatures. If the reaction temperature exceeds about 80° C., decomposition of the tertiary alkyl amine oxide product may occur.

It is generally preferable to add a solvent for the tertiary alkyl amine oxide product to the reaction mixture. Water has been found to be a good solvent. A mixture of water and an additional solvent, such as a lower aliphatic alcohol, a glycol, a glycolether or solvents sold under the trade name "Cellosolve" may be employed when the amine oxide product has a high molecular weight. Inasmuch as the tertiary amine reactant is not soluble in water, it is generally desirable to slowly add water to the reaction mixture, or to add the water at an intermediate point during the reaction, as opposed to adding the water to the reaction vessel at the beginning of the reaction. When an alcohol or other non-aqueous solvent is employed in addition to water, the alcohol may be added to the reaction mixture at the beginning of the reaction, with the water being added at an intermediate point in the reaction.

The oxidizing agent, e.g., hydrogen peroxide, is slowly added to the tertiary amine at the reaction temperature under conditions of vigorous agitation. It has been found that a preferred method of manufacturing the amine oxide of the present invention includes slowly adding the hydrogen peroxide or other oxidizing agent to the tertiary amine with agitation over a period of about one hour at a temperature of between about 50° C. and about 65° C., thereafter adding a sufficient amount of water to solubilize the amine oxide product, raising the reaction temperature to between about 75° C. and about 80° C. and holding the reaction mixture at this temperature until the reaction is completed.

The reaction is generally completed in between about 5 and about 10 hours, and a solution of the tertiary γ-alkoxypropylamine oxide of between about 25 percent and about 50 percent concentration is obtained, depending upon the amount of solvent added to the reaction vessel. The tertiary amine oxide solution may be a fluid liquid, a viscous liquid, or a paste, depending upon the number of carbon atoms in the alkyloxypropyl radical and the amount of solvent added.

If desired, the aqueous tertiary amine oxide solution may be dried to provide a tertiary amine oxide paste of low moisture content. The tertiary amine oxides prepared in accordance with the described method are particularly useful as suds builders in anionic detergents and as hair conditioners in shampoos. Further, the novel amine oxides of the present invention impart improved mildness to alkylaryl sulfonic acid detergents.

EXAMPLE I

Tertiary γ-dodecoxypropyldimethylamine was prepared by alkylating γ-dodecoxypropylamine in accordance with copending application Ser. No. 502,557. 100 parts of the tertiary γ-dodecoxypropyldimethylamine was heated to 65° C. in a reaction vessel and 28 parts of a 50 percent aqueous solution of hydrogen peroxide was added dropwise to the tertiary amine under conditions of vigorous agitation over a period of one hour. 193 parts of water was then added to the reaction vessel and the reaction temperature was raised to 75° C.

After an additional reaction period of six hours at 75° C., 98 percent of the tertiary amine had been converted to tertiary γ-dodecyloxypropyldimethylamine oxide. The amine oxide product was a viscous solution containing 33 percent amine oxide. The amine oxide product had a Gardner color of less than 1 and was completely miscible with water. The amine oxide product exhibited good surfactant properties when used as a wetting agent.

EXAMPLE II 100 parts of tertiary γ-dodecoxypropyldihydroxyethylamine, prepared by the reaction between γ-dodecoxypropyl amine and two mols of ethylene oxide as disclosed in copending application Ser. No. 502,472 was introduced into a reaction vessel and heated to 65° C. 22 parts of a 50 percent aqueous solution of hydrogen peroxide was added dropwise to the tertiary amine under conditions of vigorous agitation over a one hour period. When all of the hydrogen peroxide had been added, the mixture gelled in the reaction vessel. The reaction mixture was then fluidized by the addition of 185 parts of water.

The reaction temperature was then raised to 75° C. and the reaction was continued for an additional period of four hours, after which 98.5 percent of the tertiary amine had been converted to tertiary γ-dodecoxypropyldihydroxyethylamine oxide. 34 parts of water were added to the product to obtain a 30 percent solids aqueous solution which was viscous and slightly hazy. The dodecoxypropyldihydroxyethylamine product provided by this example was completely miscible in water, and had good surfactant properties when employed as a hair conditioner and anti-static agent in shampoos.

EXAMPLE III

A mixture of fatty alcohols derived from coconut oil was reacted with acrylonitrile, hydrogenated and reacted with two mols of ethylene oxide to form tertiary γ-cocooxypropyldihydroxyethylamine in accordance with Ser. No. 502,472. 52 parts of hexylene glycol was added to 100 parts of the tertiary amine and the solution was heated to 65° C. 21 parts of a 50 percent aqueous solution of hydrogen peroxide were added dropwise to the solution under conditions of vigorous agitation over a one hour period. 88 parts of water were then added to the mixture and the reaction temperature was raised to 75° C. At the end of an additional reaction period of the five hours at 75° C., 98 percent of the tertiary amine was converted to tertiary γ-cocooxypropyldihydroxyethylamine oxide.

The reaction product was a fluid transparent 50 percent solution of the tertiary amine oxide. The tertiary γ-cocooxypropyldihydroxyethylamine oxide was miscible with water and exhibited desired surfactant properties when used as a suds builder for an alkylaryl sulfonic acid detergent.

EXAMPLE IV

A tertiary γ-cetoxypropyldimethylamine was prepared in accordance with Ser. No. 502,557. 52.5 parts of isopropanol was added to 100 parts of the tertiary amine and the solution was heated to 60° C. in a reaction vessel, 23 parts of a 50 percent aqueous hydrogen peroxide solution were then added dropwise to the reaction mixture under conditions of vigorous agitation over a period of about 1 hour. 140 parts of water were then added to the reaction mixture, the reaction temperature was raised to 75° C. and the reaction was continued for an additional period of six hours.

At the end of the six hour reaction period, 97.5 percent of the tertiary amine was converted to tertiary γ-cetoxypropyldimethylamine oxide which was a fluid transparent solution containing 40 percent amine oxide. The 40 percent solution was diluted with an additional 5 percent water and both the 40 percent solution and the diluted solution had a solubility in water equivalent to the preceding examples and exhibited good surfactant properties.

EXAMPLE V

The tertiary γ-cetoxypropyldimethylamine oxide product of Example IV was heated to 40° C. in a flash evaporator under 20 mm. of mercury vacuum for about 5 hours. A concentrated product was obtained in the form of a thick paste containing about 80 percent amine oxide. The paste was readily soluble in water and was considered to be equivalent to the fluid mixture of Example IV.

EXAMPLE VI 1250 grams of a mixture of $C_8$ and $C_{10}$ alcohols was cyanoethylated with 570 grams of acrylonitrile at a temperature of 35° C. and the product was hydrogenated with hydrogen in the presence of a Raney nickel catalyst at 205° C. to form a secondary di(γ-alkoxypropyl) amine which had a total amine value of 155.2 and contained 91.5 percent secondary amine and 3.5 percent primary amine.

500 grams of the secondary di(γ-alkoxypropyl) amine was reacted with 65 grams of ethylene oxide in a pressure reactor at 175° C. until an ethoxylated tertiary di(alkoxypropyl) amine product was obtained which contained 99 percent tertiary amine and had a total amine value of 138.

200 grams of the tertiary amine and 210 grams of isopropanol were introduced into a reactor and heated to 65° C. whereupon 38 parts of a 50 percent aqueous hydrogen peroxide solution was added dropwise to reaction mixture over a period of one hour under conditions of vigorous agitation. After addition of the hydrogen peroxide was completed the temperature of the reaction mixture was raised to 75° C. and held at this temperature for six hours after which time 97 percent of the tertiary amine had been converted to the corresponding amine oxide.

72 grams of water was then added to the reaction mixture to provide a viscous translucent product containing 38.5 percent amine oxide. The product provided excellent results when employed as a fabric softener.

EXAMPLE VII 500 grams of the secondary di(γ-alkoxypropyl) amine prepared in accordance with Example VI and 15 grams of Raney nickel were introduced into a pressure reactor and heated to 180° C. The reactor was maintained at this temperature and sparged with hydrogen at 100 p.s.i.g. and 115 grams of a 37 percent aqueous formaldehyde solution was slowly added to the reactor over a period of three hours. A tertiary di(alkoxypropyl) methyl amine product was obtained which contained 97 percent tertiary amine and had a total amine value of 142 and a Gardner color of 2.

200 grams of the tertiary amine product and 200 grams of isopropanol were introduced into a reactor and reacted with 41 grams of a 50 percent aqueous hydrogen peroxide solution in accordance with Example VI. 70 grams of water was added to the reaction mixture to provide a 40 percent solids amine oxide product in which 96 percent of the amine was converted to amine oxide.

It can be seen that the novel tertiary γ-alkoxypropylamine oxides have been provided which have improved solubility in aqueous solutions. The amine oxides of the present invention are useful as wetting agents and emulsifiers, and are particularly useful as suds builders in anionic detergents and as hair conditioners in shampoos.

What is claimed is:

1. A tertiary di(γ-alkoxypropyl)amine oxide having the formula

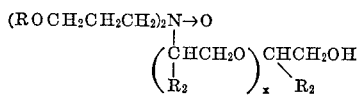

where R is an alkyl radical of between about 6 and about 20 carbon atoms, $R_2$ is hydrogen or a methyl radical, and $x$ is between 1 and about 3.5.

2. A tertiary di(γ-alkoxypropyl)amine oxide having the formula

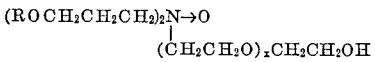

where R is an alkyl radical of between about 6 and about 20 carbon atoms, and $x$ is between 1 and about 3.5.

3. A tertiary di(γ-alkoxypropyl)amine oxide having the formula

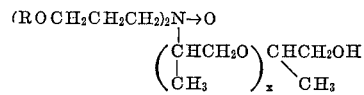

where R is an alkyl radical of between about 6 and about 20 carbon atoms, and $x$ is between 1 and about 3.5.

4. A tertiary di(γ-dodecoxypropyl)hydroxyethylamine oxide having the formula

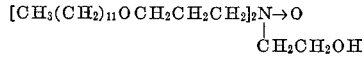

References Cited

UNITED STATES PATENTS

| | | |
|---|---|---|
| 3,206,512 | 9/1965 | Koebner et al. |
| 3,215,741 | 11/1965 | Chadwick. |
| 3,202,714 | 8/1965 | Zimmerer et al. |

FOREIGN PATENTS

| | | |
|---|---|---|
| 1,163,850 | 2/1964 | Germany. |

CHARLES B. PARKER, *Primary Examiner.*

R. L. RAYMOND, *Assistant Examiner.*

U.S. Cl. X.R.

252—152